Aug. 12, 1958     A. DUMAS     2,847,113
CONVEYOR MEANS FOR CONFECTIONERY MOULDS OR OTHER ARTICLES
Filed May 17, 1956     3 Sheets-Sheet 1
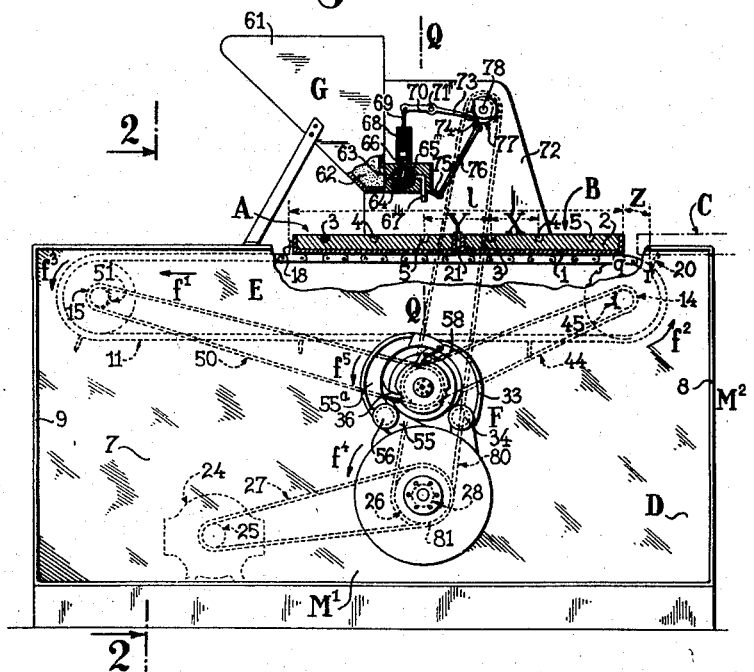
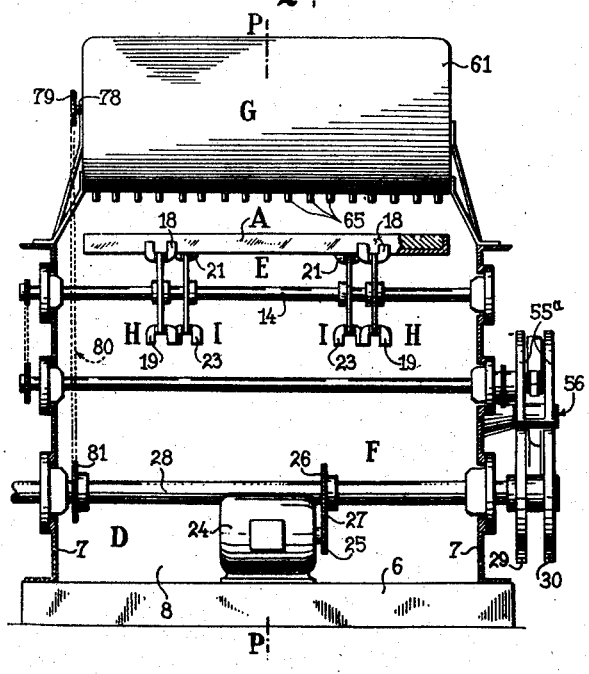
Albert Dumas
By Diggins & LeBlanc
ATTORNEYS

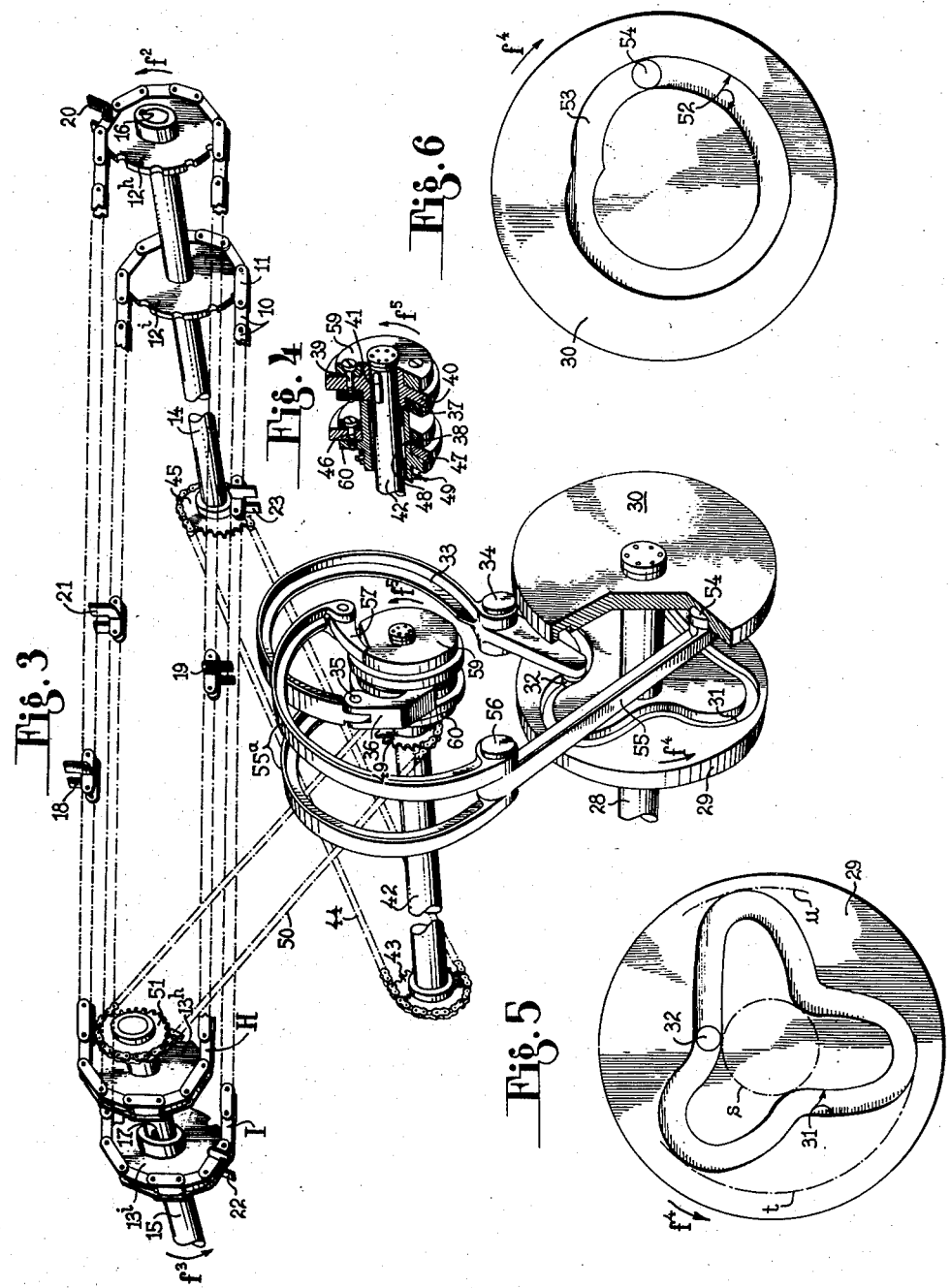

United States Patent Office 2,847,113
Patented Aug. 12, 1958

2,847,113

CONVEYOR MEANS FOR CONFECTIONERY MOULDS OR OTHER ARTICLES

Albert Dumas, Puteaux, France, assignor to Anciens Etablissements A. Savy, Jeanjean & Cie, Courbevoie, France, and Sté: Barker & Perkins Limited, Peterborough, England Application May 17, 1956, Serial No. 585,425

Claims priority, application France May 18, 1955

6 Claims. (Cl. 198—135)

The present invention relates to conveyor means of the type which comprises at least two parallel endless chains driven in the same direction by rotary elements, for conveying confectionery mould or other articles, one behind the other, over their top courses by means of lugs or like elements attached at intervals to the chains, and more particularly to the type wherein each article, in turn, is arrested at one or more successive positions adjacent means operative upon the articles, for a period sufficient for the operation to be effected.

As an example of the above, in the case of filling confectionery moulds each of which possesses a number of transverse rows of mould cavities, each mould has to be arrested at a number of successive positions such that at each position a row of mould cavities is vertically aligned with a transverse row of filling nozzles corresponding in number and spacing with the mould cavities in the row.

In existing conveyor means of the type indicated, the article is moved along solely by the aid of a lug or other pusher element in such a way that when the conveyor is stopped the article may move on a small distance due to its inertia and may cease to be engaged by the pushing lug. Consequently the article may not be accurately aligned with the means operative upon the articles thereby possibly resulting in incorrect operation thereon, e. g. when filling mould cavities this misalignment may cause incorrect filling. This effect is obviously increased when the speed of the conveyor is increased.

Accordingly it is an object of the present invention to provide improved conveyor means of the type indicated, which will arrest each article at one or more successive positions such that, at each position, the article will be positioned accurately in relation to the means operative upon the articles.

The invention consists in conveyor means of the type indicated wherein said endless chains are driven such that each article is confined between a lug on one chain serving as a retaining lug and a lug on another chain serving as a pushing lug, whereby each lug serves alternately as a pushing lug for one article then as a retaining lug for the following article.

In the accompanying drawings:

Fig. 1 is a diagrammatic view, in elevation with partial sections, of a machine intended for filling the cavities of the confectionery moulds, this machine being provided with conveyor means of the improved type according to the invention;

Fig. 2 is a vertical diagrammatic cross section, along line 2—2 of Fig. 1;

Fig. 3 is a view in perspective, with an extraction of the conveyor means,

Figure 7:
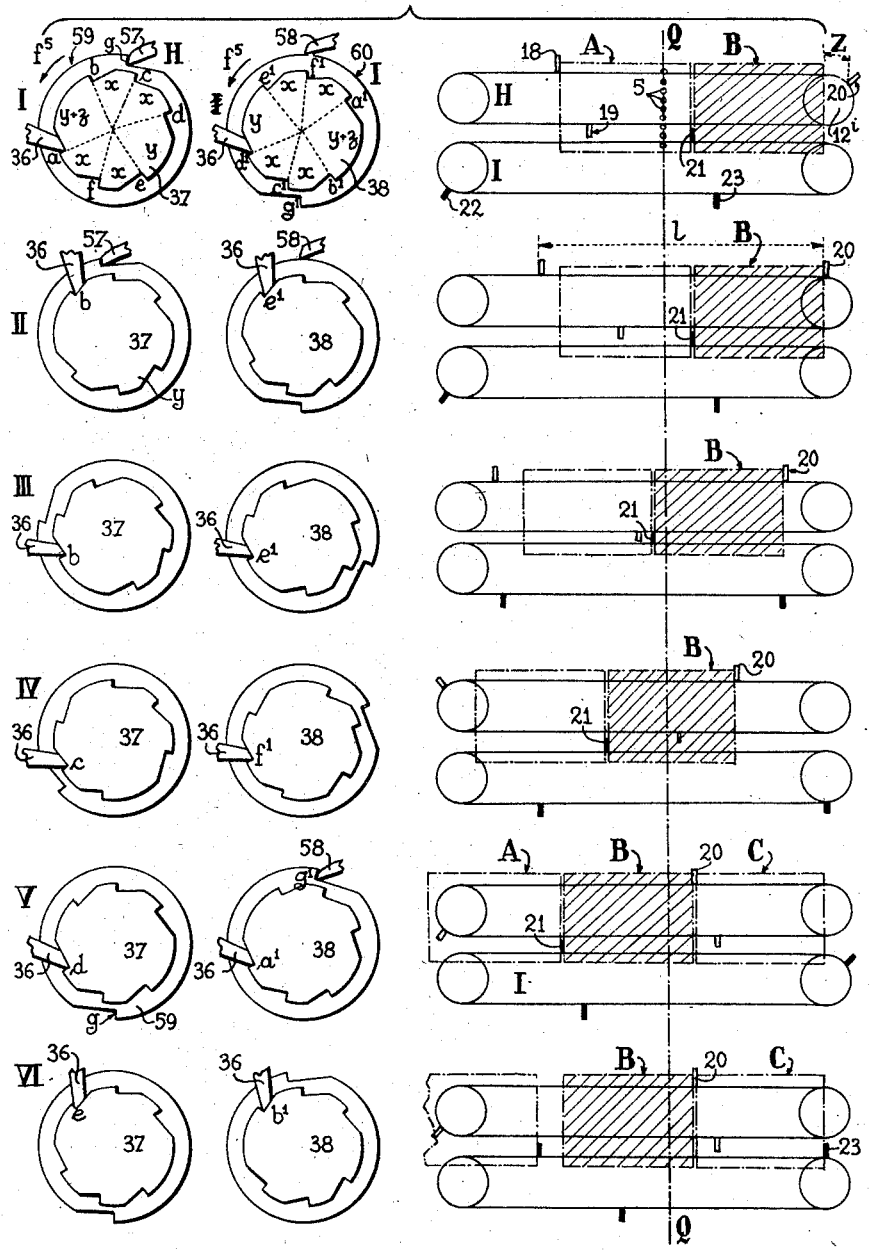

Fig. 4 is a partial section, with an extraction, showing the ratchet device of the conveyor means, Figs. 5 and 6 are front views of the two cams of the conveyor means, and Fig. 7 is a general arrangement, showing in six successive positions, designated by Figures I to VI, the ratchets relating to the two chains and the corresponding positions of the chains and of three moulds in course of conveyance on these chains.

In carrying the invention into effect according to one mode by way of example, the machine $M^1$ (Fig. 1) is intended for filling by the aid of a confectionery product, such as chocolate, cavities provided in a series of moulds A, B, C, . . . arranged following one another and travelling horizontally in the downstream direction indicated by the arrow $f^1$. These moulds may come, for instance, from a machine at the feed end $M^2$ used for the preparation of the moulds and the latter leave the machine $M^1$ at its discharge end (on the left in Fig. 1) after being filled, to go either to an automatic demoulding machine or to some station for automatic or manual handling.

The feeding machine $M^1$ shown has a frame D, at the top of which there is arranged the conveyor proper designated by E, driven by mechanism F and intended for moving the moulds A, B . . . in such a way that the latter file after one another downstream beneath a feed device G intended for filling their pockets and driven from the mechanism F.

Below will be described in detail each of these devices.

(1) Moulds A, B, C . . . Each of these moulds, designated in the Confectionery trade by the term "trays," is made up of a pan 1 of wood, metal or any other suitable material, containing a filling 2, comprising a powdery material such as starch for example, in which are provided successive rows 3, 4, 5, of a certain number of cavities. The transverse lines passing through the centres of the cavities of the successive rows are equidistant, their distance being equal to X.

Moreover, the distance between the lines passing through the centres of the cavities of the upstream end or last row of a mould (such as row 5 mould A) and the cavities of the downstream end or first row of the succeeding mould (i. e. row 3, mould B) has the distance Y, greater than X.

(2) Frame D. The latter consists of a base 6 carrying two parallel longitudinal side plates 7. These side plates are, preferably, cross-stayed at their ends by end walls, viz. feed end 8 and downstream end 9. They are, moreover, cross-stayed between these two end walls by the various spindles which will be described below.

(3) Conveyor proper, designated E. This comprises, arranged on each side of a vertical longitudinal symmetrical plane PP (Fig. 2), two pairs of chains H and I. These are two endless chains of which both the top courses and bottom and courses are arranged side by side, these courses being parallel and horizontal.

Each of these chains is constructed in known manner, by links 10, which are pivotally connected by pins 11 and they are each tensioned over a pair of sprockets, one at the feed end $12^h$ or $12^i$ and the other at the downstream end $13^h$ or $13^i$ (see in particular Fig. 3).

The sprockets at the feed end are mounted on a first cross shaft 14, and the sprockets at the discharge end are mounted on a second shaft 15. These two shafts are driven in rotation, as will be shown below, in the same direction indicated by arrows $f^2$ and $f^3$ (Figs. 1 and 3).

Shaft 14 drives the chain H in the direction of the arrow $f^1$, by reason of the fact that the sprocket $12^h$ is keyed at 16 on this shaft, and the other chain I is driven by the shaft 15, the sprocket $13^i$ being keyed at 17 on this shaft. The two other sprockets $13^h$ and $12^i$ run idle on their respective shafts 15 and 14.

Each of these chains carries three lugs, namely: chain H, lugs 18, 19 and 20 (see Figs. 2, 3 and 7), and chain I, three other lugs 21, 22 and 23. These lugs are rigidly attached to links of the chains, on each side of these links and in the example shown they have a projecting portion in the shape of a fork, arranged in a plane which is transverse to the vertical plane containing the longitudinal centre lines of the two courses of the chain and on each side of this vertical plane.

The lugs of each chain are situated at a distance apart $l$ which is constant and this distance is the same for the two chains. This distance $l$ is indicated in Fig. 7 (item II) and is equal to the length, overall, of two moulds such as A and B, augmented by the thickness of two lugs such as 18 and 21, and by a length Z, Fig. 7 (item I) corresponding at least to the portion $qr$ of the arc of winding of the chain on the pinion at the feed end, this portion being reckoned between the point $q$ at which the top longitudinal rectilinear course commences, that is to say the point at which the horizontal plane in which the articles are travelling is tangential to the arc of winding and the point $r$ at which should be situated the base of the upstream face of a lug, such as lug 20, so that the end of this downstream face of the lug may be situated beneath the said horizontal plane.

This length Z will hereinafter be known as "retraction length." In other words $l$ is given by the equation: $l=2nX+2Y+Z$, where $n$ is the number of successive equal positioning movements each article must undergo in relation to the feed device G (i. e. $n$ is equal to number of transverse rows of cavities $-l$).

Moreover, from one chain to the other, the lugs are staggered to an extent corresponding very closely to half this length $l$. Their exact positions will moreover be defined later.

(4) Driving mechanism F of the chains. This mechanism comprises an electric motor 24 (Figs. 1 and 2) coupled by sprockets 25 and 26 and a chain 27 to a cross shaft 28 (Figs. 1 to 3). Two cams are keyed on this shaft 28, one, No. 29, being designated as "chain advancement" cam and the other, No. 30, designated "positioning" cam, their purposes being respectively: that of the first, No. 29, to communicate to the chains the travel X or Y, and that of the second, No. 30, to cause a lug, first of one and then of the other chain, as it reaches the top course at the feed end, to traverse the retraction distance Z defined above. These cams turn with shaft 28 in the direction of the arrow $f^4$ (Figs. 1, 3, 5 and 6).

The advancement cam 29 has a cam track 31, in the shape of a star with points corresponding in number $(n+l)$ to the rows of pockets in each of the moulds A, B .... All the roots of the points lie on an inner circle $s$, whereas the extremities of the points lie, all of them with the exception of one, on an outer circle $t$, the remaining extremity lying on another circle $u$, of still greater diameter. The difference between the radii of the circles $t$ and $u$ will be set forth later.

In this track 31 runs a follower 32, carried by the end of a lever 33, linked around a fixed spindle 34. This lever 33 is bent in the form of an arc and, at its end, is linked, around a transverse spindle 35, a pawl 36. This pawl 36 co-operates with two ratchet wheels 37 and 38. The ratchet wheel 37 is secured by screws 39 (see Fig. 4), to a disc formed by a cheek 40 and a boss, keyed at 41 on a cross shaft 42. This shaft 42 carries a sprocket 43, which is coupled by a chain 44 to another sprocket 45, keyed on the feed end shaft 14.

Consequently, every time that the pawl 36 causes ratchet wheel 37 to turn in the direction of the arrow $f^5$ (Figs. 1, 3, 4 and 7) the shaft 14 is driven in the direction of the arrow $f^2$ aforementioned, that is to say in the direction of advancement of the chain H which is linked to the rotation of this shaft by sprocket $12^h$.

In similar fashion, the other ratchet wheel 38 is secured by screws 46 (Fig. 4) to a second cheek 47, which itself is integral with the sleeve 48, running idle on shaft 42. This sleeve 48 is secured to a toothed wheel 49, connected by a chain 50 to a sprocket 51, keyed on the discharge end shaft 15 in such a way that every time the ratchet wheel 38 advances in the direction of arrow $f^5$, under the action of pawl 36, shaft 15 turns in the direction of arrow $f^3$ which provides the advancement of the chain I, passing over the keyed sprocket $13^i$.

Details of the ratchet wheels 37 and 38 are shown in the various positions I to VI in Fig. 7. These two wheels are identical, but are staggered in their mean positions to the extent of 180° in relation to one another. They each have six abutments, namely $a, b \ldots f$ for wheel 37 and similar abutments $a^1, b^1 \ldots f^1$ for wheel 38. The angles at the centre between the successive abutments $a, b \ldots a^1, b^1 \ldots$ are the same for the two ratchets and have the following successive values $(y+z), x, x, y, x, x$ (see Fig. 7—position 1). These values $x, y$ and $z$ are such that, taking into account the drives by sprockets and chain just described, the chains H and I are moved for the corresponding distances X, Y and Z previously defined.

Further, the pawl 36, which co-operates with the two ratchet wheels 37 and 38 and which is shown twice on diagrams of Fig. 7 in combination with the two ratchet wheels, has communicated to it by the track 31 of cam 29, oscillation motions, the amplitude of which is equal to $x$ for the two points of the cam in star form, defined by the circle $t$ (Fig. 5) and with amplitude $y$ for the point defined by the circle $u$.

Cam 29 is keyed on in such a way that the amplitude of the next movement of the pawl will be equal to $y$ when in positions I and V of Fig. 7, that is to say at the moments of "taking up position," i. e. at the moment at which one of the chains must advance by Y, whereas the other must advance by Y+Z. For all the other positions of the ratchet wheel, the amplitude of movement of the pawl is equal to $x$.

As it will have been seen, at the moment of taking up position (i. e. catching up the retraction length Z), cam 29 only determines the stroke $y$ of the ratchet wheels (i. e. the stroke Y of the two chains), and the supplementary stroke $z$ which it is necessary to communicate at that moment to one of the ratchet wheels for movement to the extent of Z of one of the two chains, is provided by the other cam 30.

This cam 30, which runs in the same direction as cam 29, is also keyed to shaft 28 (rotation being indicated by the direction of the arrow $f^4$ in Fig. 6), and has a cam track 52 which only has one peak at 53. This cam track engages a follower 54 (Fig. 3) carried by the end of a lever 55, linked round a fixed cross spindle 56. Beyond the spindle 56, the lever is in the shape of a fork $55^a$ and each of its branches carries at the extremity a pawl 57 or 58.

The pawl 57 is to be seen in Fig. 3 and in Fig. 7, to the right of the left hand ratchet wheels. The pawl 58 which, in Fig. 3, is hidden by pawl 36, is visible on the ratchet wheels at the middle of Fig. 7. These two pawls are superimposed in Fig. 1 where likewise pawl 57 can be seen.

The peak 53 of the cam track 52 is such that, for each complete rotation of cam 30, the pawls 57 and 58 oscillate in the direction of the arrow $f^5$, then in the direction opposite to angle $z$ corresponding to the value Z of the retraction of the lug such as 20 (Figs. 1 and 7) when this is at the point of reaching the upper course of the corresponding chain.

The pawls 57 and 58 are arranged on the right of the two ratchet wheels 59 and 60 respectively (Figs. 3, 4 and 7), each fixed with the compound wheel 37 and 38 on cheek 40 or 47.

Each ratchet wheel 59 or 60 has a single abutment $g$ or $g^1$ and these abutments assume practically diametrically opposite positions of the two ratchets in such a way that when one of the pawls, 57 for instance, engages abutment $g$ of wheel 59, the other pawl, 58, bears on the full portion of the ratchet wheel 60 and vice-versa.

Consequently during each revolution of shaft 28, cam 29 causes the two ratchet wheels 37 and 38 to describe a complete cycle (which will be explained in detail later), whereas cam 30, by its track 52, advances alternately ratchet 59 of ratchet 60 to the extent of z corresponding to the advance Z of chain H or I.

(5) Feed device G. This may be of any known type and has been shown only in diagrammatic fashion in Figs. 1 and 2. It comprises a feed hopper 61, which contains the substance 62 to be distributed and which is fed via an orifice 63 (Fig. 1) into a chamber 64 of a distribution cylinder 65.

There are provided as many outlet orifices 63 as there are cavities in each row of cavities of the moulds and the cylinder 65 provides for causing alternately each hole 63 to communicate either with the interior of a pump 66 or with a discharge nozzle 67. The centre lines of the nozzles 67 are arranged in a vertical cross plane QQ and the distance between them corresponds to that of the centres of the successive cavities of one and the same row of cavities.

Pistons 68 move in the cylinders 66 of the pump; they are connected by rods 69 and levers 70 to a shaft 71, trunnioned in the fixed sideplates 72 and on this shaft there is keyed a lever 73, co-operating with a cam 74 having a single boss.

In the same way, the cylinder head 65 is connected to a lever 75, in one piece with a connecting rod 76, co-operating with another cam 77. The cams 74 and 77 are similar but staggered in angular fashion in such a way that each piston 68 draws in from the hopper 61 and delivers into the corresponding nozzle 67.

The two cams 74 and 77 are keyed on the same shaft 78 connected by a pinion 79 and a chain 80 to a pinion 81 keyed on the driving shaft 28 of the mechanism F.

The transmission ratio between shafts 28 and 78 in such that shaft 78 makes a number of revolutions equal to the number of rows of cavities per mould, when shaft 28 makes one revolution.

Considering now the operation of the machine, reference should be made more particularly to Fig. 7, which shows the diagrammatic positions of the chains and of two moulds (on the right hand side of the illustration), and the corresponding positions of the ratchet wheels and pawls (on the left and in the middle of the illustration), for 6 successive positions I, II . . . VI occupied by the parts in the course of a working cycle. It will be noted that the plane of deposition QQ, has been shown on the diagram of chains in Fig. 7.

Starting with the machine in the position I, the last deposit into the row of cavities 5 of mould A has just been finished and the preceding mould is on the point of leaving, the chains H and I, towards the left.

In this position I, the pawls 36 are engaged by the abutments $a$ and $d^1$ of the ratchet wheels 37 and 38, the pawl 57 is engaged by the single abutment $g$ of the ratchet wheel 59 and the pawl 58 is retracted on the full circular portion of the ratchet 60. The lug 20 of the chain H is in retracted position at distance Z from the point where the upper plane of the chains is tangential to the feed end sprocket 12$i$.

Mould A is held between the lug 18 acting as retaining lug of chain H and lug 21, acting as pushing lug of chain I.

The mould B, the sprockets of which are empty, has just come on to the chains coming from the feed end machine M² and may or may not just touch the lug 21.

Starting from this position I, the pawls 36 are about to retreat under the action of the point of the cam track 31 defined by the circle $u$ (Fig. 5) as the roller 32 is situated, at position I, at the point represented in Figs. 3 and 5.

The roller 32 then comes to the rising portion of the longer point defined by the circle $u$ of the slot 31 of the cam 29. The pawls 36 are thus about to retreat, to the extent of $y$. However, simultaneously the roller 54 which is moving in the track 52 of cam 30, likewise reaches the descending portion of the track 52 of the cam 30 in such a way that the two pawls 57 and 58 are about to advance to the extent of $z$, but only the pawl 57 will cause the combined ratchet wheel 59 to advance the ratchet wheel 37 which is connected with it, while the pawl 58 will slide over the circular portion of the ratchet wheel 60, and will be without action on it or wheel 38.

Finally under the action of the two cams 29—30 and the pawls, ratchet wheel 37 will advance to the extent $y+z$, while the ratchet wheel 38 will only advance to the extent of $y$.

Position II shows the moment at which, the length $z$ having been caught up by chain H and the pawl 57 having finished its advance motion, pawl 36 is about to replace its action which has produced rotation $z$ and advance portion $Z$, in order, in its turn, to produce a supplementary rotation $y$ while the pawl 36 will, at the same time, turn ratchet 38 to the same extent $y$.

On the corresponding chain diagram, it will be seen that the lug 20 has come into contact with the rear face of mould B, which, henceforth, will be held between the lug 21, which is now about to play the part of retaining lug and lug 20, which, in its turn, is about to play the part of pushing lug.

Starting from this position II, the advancement of mould B and consequently of mould A, which is situated in front of it, goes forward in successive skips of length $x$ to bring into the plane QQ the successive rows 3, 4 and 5 of pockets of this mould B.

Position III shows the position, at the end of the first advancement X obtained by the aid of the pawls 36 having acted on abutments $b$ and $c$ of the ratchets 37 and 38, whilst position IV shows the position reached for the second advance X, the pawls 36 being shown at the end of their forward stroke engaging abutments $c$ and $f^1$.

Position V corresponds to the end of the third period of advancement X of mould B, which is now in the same position in which mould A was at position I, a new mould C having moreover arrived following it on the chains.

The pawls 36 are engaging abutments $d$ and $a^1$ of the ratchet wheels 37 and 38, while the pawl 57 is now on the full portion of the ratchet wheel 59, whereas the pawl 58 is engaging the abutment $g^1$ of the combined ratchet wheel 60.

The lug 23 of the chain I is in position of retraction and in the course of passage from position V to position VI, this lug will advance to the extent of Z as shown in regard to the passage from position I to position II in reference to lug 20 of chain H.

Position VI corresponds to the taking up of position by lug 23 which has arrived behind mould C, starting from which position the first advancement is about to commence, this advancement being intended to bring into the plane QQ the first row of pockets of mould C which will henceforth be held between lug 20, which is now about to play the part of retaining lug, whereas lug 23 will, in its turn, play the part of pushing lug.

Naturally, the invention is in no way limited to the form of construction shown and described, which has only been chosen by way of example.

The three rows of pockets shown by way of example may each be replaced, by a number of groups of rows fed at the same time by independent pistons and nozzles, the movements $x$ being in this case reckoned from the middle cross line of each group of rows.

In the example shown the chains have been shown with three lugs but it is quite clear that these chains can have any length according to the distance necessary between the entrance to the machine and its exit, the driving mechanism of these chains remaining such as described.

Finally, it is fully clear that the invention applied to the conveyance of confectionery moulds can be used for the conveyance of various objects or articles which have to undergo movements of the same nature as those which have been described.

Having now described my invention what I claim as new and desire to secure by Letters Patent is:

1. In conveyor means comprising at least two parallel endless chains driven in the same direction, lugs fixed on each of said chains in equally spaced relation, the lugs of one chain being offset relatively to the lugs of the other chain longitudinally of the chains, whereby each article to be conveyed is confined between one lug of one chain and one lug of the other chain; intermittent driving means for imparting to each of said chains a series of advancements constituting a cycle, the cycles of advancements imparted to the two chains by said intermittent driving means being equal, and additional intermittent driving means whose action is superimposed on the action of said intermittent driving means, said additional means imparting, during each cycle, an additional advancement alternately applied to one chain in one cycle and to the other chain in the following cycle, whereby, on each chain, each lug alternately serves as a pushing lug for one article, then as a retaining lug for the following article, said articles being fed longitudinally of the chains on the upstream ends of said chains.

2. In conveyor means for conveying articles of a certain length, two parallel endless chains mounted on sprocket means and driven in the same direction, said articles being fed longitudinally of said chains on the upstream ends of said chains; lugs fixed on each of said chains in equally spaced relation, the distance between the leading faces of two successive lugs of each chain being equal to the sum of the lengths of two articles plus the thickness of two lugs and plus a length Z, said length Z being at least equal to the circumferential length of that portion of the chain passing over the sprocket means at the feed end between the point at which the supporting plane of the two articles on the chain is tangential to the arc of this chain and the point of this arc at which the base of the advance face of a lug must be situated so that the free end of such lug lies beneath said plane so that a fresh article may enter on the course without interference by the said lug, the lugs of one chain being offset relatively to the lugs of the other chain longitudinally of the chains, whereby each article to be conveyed is confined between one lug of one chain and one lug of the other chain; intermittent driving means for imparting to each chain cycles of advancements, each cycle comprising $n$ advancements whose amplitude is X and one advancement whose amplitude is Y, $n$ being the number of successive positions at which each article should be successively stopped relative to a fixed transverse plane, X being the distance between the successive equidistant transverse lines of said article which must stop in said transverse plane, and Y being the distance between the last of said lines of one article and the first of said lines of the following article; and additional intermittent driving means whose action is superimposed on the action of said intermittent driving means, said additional means imparting, at each cycle, an additional advancement having an amplitude Z which, alternately is added to the Y advancement of one chain in one cycle and the Y advancement of the other chain in the following cycle whereby, in each cycle, the Y amplitude of advancement of one of said chains is alternately replaced by a $Y+Z$ amplitude.

3. Conveyor means according to claim 2 wherein said intermittent driving means and said additional intermittent driving means comprise ratchet wheels, positive driving means between said chains and said ratchet wheels, pawls cooperating with said ratchet wheels, and cam means cooperating with said pawls, the abutments on the ratchet wheels and the tracks of said cam means being adapted to impart to each chain the X, Y, and Z advancements in conformity with the cycle.

4. Conveying means according to claim 2 wherein said intermittent driving means and said additional intermittent driving means comprise, for each chain, a first and a second ratchet wheel, positive driving means between said chain and said ratchet wheels, two pawls cooperating with said ratchet wheels, respectively; and cam means actuating said pawls respectively; said first ratchet wheel for each chain being adapted to provide the X and Y advancements, and said second ratchet wheel the Z advancement, the cam means which actuates the pawls which cooperate with said first ratchet wheel comprising $n-1$ lifts to impart $n$ advancement of amplitude X and the advancement of amplitude Y, and said other cam means comprising only one lift to actuate, in each cycle of amplitude $nX-Y$, only one of said second ratchet wheels alternately whereby, in each cycle, the Y advancement of one of the two chains is alternately replaced by a $Y+Z$ advancement.

5. Conveying means according to claim 2 wherein said intermittent driving means and said additional intermittent driving means comprise, for each chain, a first and a second ratchet wheel, positive driving means between said chain and said ratchet wheels, two pawls cooperating with said ratchet wheels, respectively; and two cams actuating said pawls respectively; said cams being common to said pawls of said two chains; said first ratchet wheel for each chain being adapted to provide the X and Y advancements, and the second ratchet wheel Z advancements, the cam means which actuates the pawls of said second ratchet wheels comprising only one lift adapted to actuate, in each cycle of amplitude $nX+Y$, only one of said second ratchet wheels alternately, whereby in each cycle the Y advancement of one of the two chains is alternately replaced by $Y+Z$ advancement.

6. In conveyor means having a longitudinal plane of symmetry, two pairs of chains disposed on each side of said plane, the chains which are in symmetric correspondence being driven in synchronism; each of the pairs constituted by two chains arranged on the same side of said plane comprising two parallel endless chains driven in the same direction, lugs fixed on each of said chains in equally spaced relation, the lugs of one chain being offset relatively to the lugs of the other chain longitudinally of the chains, whereby each article to be conveyed is confined between one lug of one chain and one lug of the other chain; intermittent driving means for imparting to each of said chains a series of advancements constituting a cycle, the cycles of advancements imparted to the two chains by said intermittent driving means being equal, and additional intermittent driving means whose action is superimposed on the action of said intermittent driving means, said additional means imparting during each cycle an aditional advancement alternately applied to one chain in one cycle and to the other chain in the following cycle, whereby on each chain each lug alternately serves as a pushing lug for one article then as a retaining lug for the following article, said articles being fed longitudinally of the chains, on the upstream ends of said chain.

References Cited in the file of this patent

UNITED STATES PATENTS 1,815,372    Frazier                 July 21, 1931